US008430781B2

United States Patent
Palfai et al.

(10) Patent No.: US 8,430,781 B2

(45) Date of Patent: Apr. 30, 2013

(54) GEAR LASH CONTROL MEMBER FOR A DIFFERENTIAL GEAR SET AND METHOD OF ESTABLISHING GEAR LASH

(75) Inventors: Balazs Palfai, Fishers, IN (US); Attila Nagy, Fishers, IN (US); Andrew Meyer, Fortville, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 245 days.

(21) Appl. No.: 12/950,516

(22) Filed: Nov. 19, 2010

(65) Prior Publication Data

US 2012/0129645 A1 May 24, 2012

(51) Int. Cl.
*F16H 48/06* (2006.01)

(52) U.S. Cl.
USPC .......... 475/230

(58) Field of Classification Search .......... 74/409
See application file for complete search history.

(56) References Cited

U.S. PATENT DOCUMENTS

| | | | | |
|---|---|---|---|---|
| 2,680,972 | A * | 6/1954 | Tone | 475/9 |
| 3,012,449 | A * | 12/1961 | Stockwell | 475/243 |
| 3,137,181 | A * | 6/1964 | Guilbert | 475/245 |
| 3,512,430 | A * | 5/1970 | Sutherland | 475/243 |
| 3,872,741 | A * | 3/1975 | Berchtold et al. | 475/246 |
| 6,814,683 | B2 * | 11/2004 | Krzesicki et al. | 475/230 |

* cited by examiner

*Primary Examiner* — Dirk Wright

(74) *Attorney, Agent, or Firm* — Cantor Colburn LLP

(57) ABSTRACT

A differential gear set including a gear housing and a first planet gear rotatably mounted to the gear housing and includes a first end portion having a plurality of planet gear teeth. A second planet gear is rotatably mounted to the gear housing and includes a first end portion having a plurality of planet gear teeth. A side gear is rotatably mounted in the gear housing and includes a plurality of side gear teeth that mechanically engage with the plurality of planet gear teeth of the first planet gear and the plurality of planet gear teeth of the second planet gear. A gear lash control member is interposed between the first and second planet gears and the side gear. The gear lash control member maintains a desired gear lash of the plurality of planet gear teeth and to the plurality of side gear teeth.

15 Claims, 5 Drawing Sheets

2
4
10
70
20
6
8
12

GEAR LASH CONTROL MEMBER FOR A DIFFERENTIAL GEAR SET AND METHOD OF ESTABLISHING GEAR LASH

BACKGROUND OF THE INVENTION

Exemplary embodiments pertain to the art of differential gear sets and, more particularly, to a gear lash control member for a differential gear set.

Engineers are exploring various methods to save weight and space in the design and construction of motor vehicles. In addition to weight and space concerns, engineers are investigating various propulsion systems to replace and/or augment fossil fuels. One current area of investigation is the use of electric powered vehicles. In an electric powered vehicle, space and weight is of great concern. Lowering component weight will lead to an enhanced operational envelope for electric motors. That is, the less weight the electric motor must move, the more energy can be devoted to moving the vehicle and prolonging operational time.

Drive train components such as motors, transmissions, differentials, and the like, require a great deal of power to operate. Existing drive train components require significant energy resources to operate. Drive components typically include large housings that support multiple gears, bearings and shafts. The large housings allow for proper assembly, adjustment of the gears to ensure desired clearances, and maintenance. Component weight, interaction between gears, rotation between bearings and other frictional loading represent a significant energy draw on a power system.

BRIEF DESCRIPTION OF THE INVENTION

Disclosed is a differential gear set including a gear housing and a first planet gear rotatably mounted to the gear housing. The first planet gear includes a first end portion having a plurality of planet gear teeth. A second planet gear is rotatably mounted to the gear housing opposite the first planet gear. The second planet gear includes a first end portion having a plurality of planet gear teeth. A side gear is rotatably mounted in the gear housing. The side gear includes a plurality of side gear teeth that mechanically engage with the plurality of planet gear teeth of the first planet gear and the plurality of planet gear teeth of the second planet gear. A gear lash control member is interposed between the first and second planet gears and the side gear. The gear lash control member is configured and disposed to maintain a desired gear lash for each of the plurality of planet gear teeth of the first and second planet gears and the plurality of side gear teeth.

Also disclosed is a method of establishing gear lash in a differential gear set. The method includes mounting a first planet gear in a gear housing. The first planet gear includes a first end portion having a plurality of planet gear teeth. A second planet gear is assembled to the gear housing opposite the first planet gear. The second planet gear includes a first end portion having a plurality of planet gear teeth. A first side gear is arranged in the gear housing. The first side gear includes a first plurality of side gear teeth that inter-engage with the plurality of planet gear teeth of the first planet gear and the plurality of planet gear teeth of the second planet gear. A gear lash control member is positioned at the first end portion of each of the first and second planet gears, and the first side gear. A second side gear is arranged in the gear housing opposite the first side gear. The second side gear includes a second plurality of side gear teeth that inter-engage with the plurality of planet gear teeth of the first planet gear and the plurality of planet gear teeth of the second planet gear. The second side gear is arranged directly adjacent the gear lash control member.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
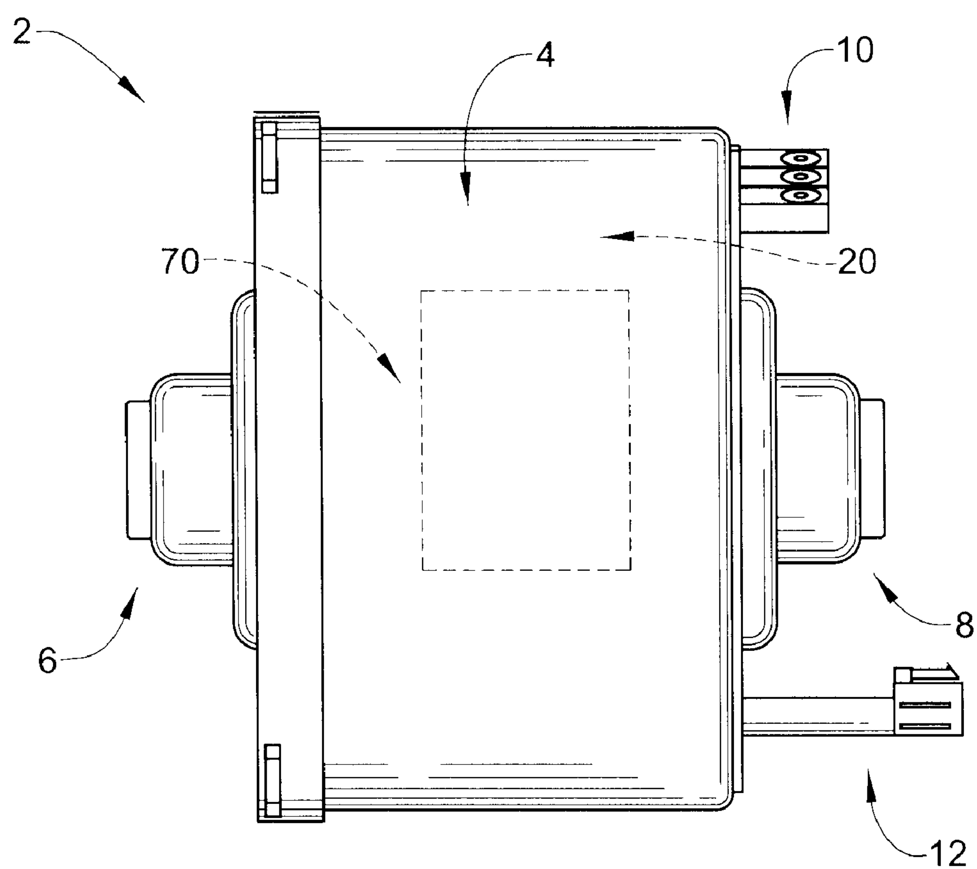
FIG. 1 is a partial cross-sectional view of a transmission member including a differential gear set provided with a gear lash control member in accordance with an exemplary embodiment.

With reference to FIG. 1, a transmission member constructed in accordance with an exemplary embodiment is indicated generally at 2. Transmission member 2 includes a housing 4 having a first output hub 6 and a second output hub 8. First and second output hubs 6 and 8 provide an interface to corresponding first and second drive wheels (not shown). Transmission member 2 is also shown to include electric power terminals 10 and a signal or sensor connector 12. As will be discussed more fully below, power terminals 10 and sensor connector 12 are electrically connected to an electric motor 20 arranged within housing 4.

Figure 2:
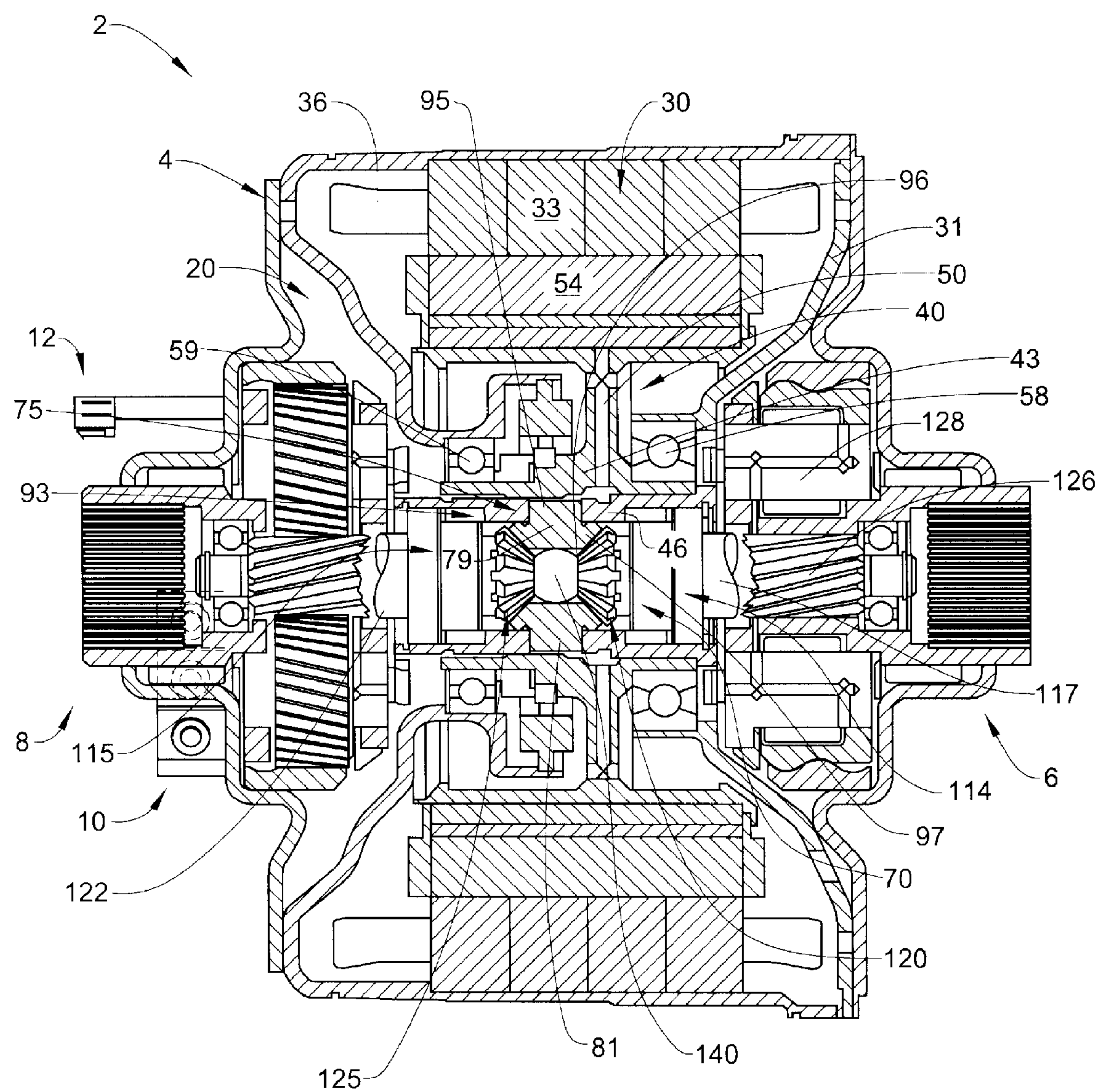
FIG. 2 is a perspective, cross-sectional view of the transmission member of FIG. 1 illustrating the differential gear set in accordance with an exemplary embodiment.
Figure 3:
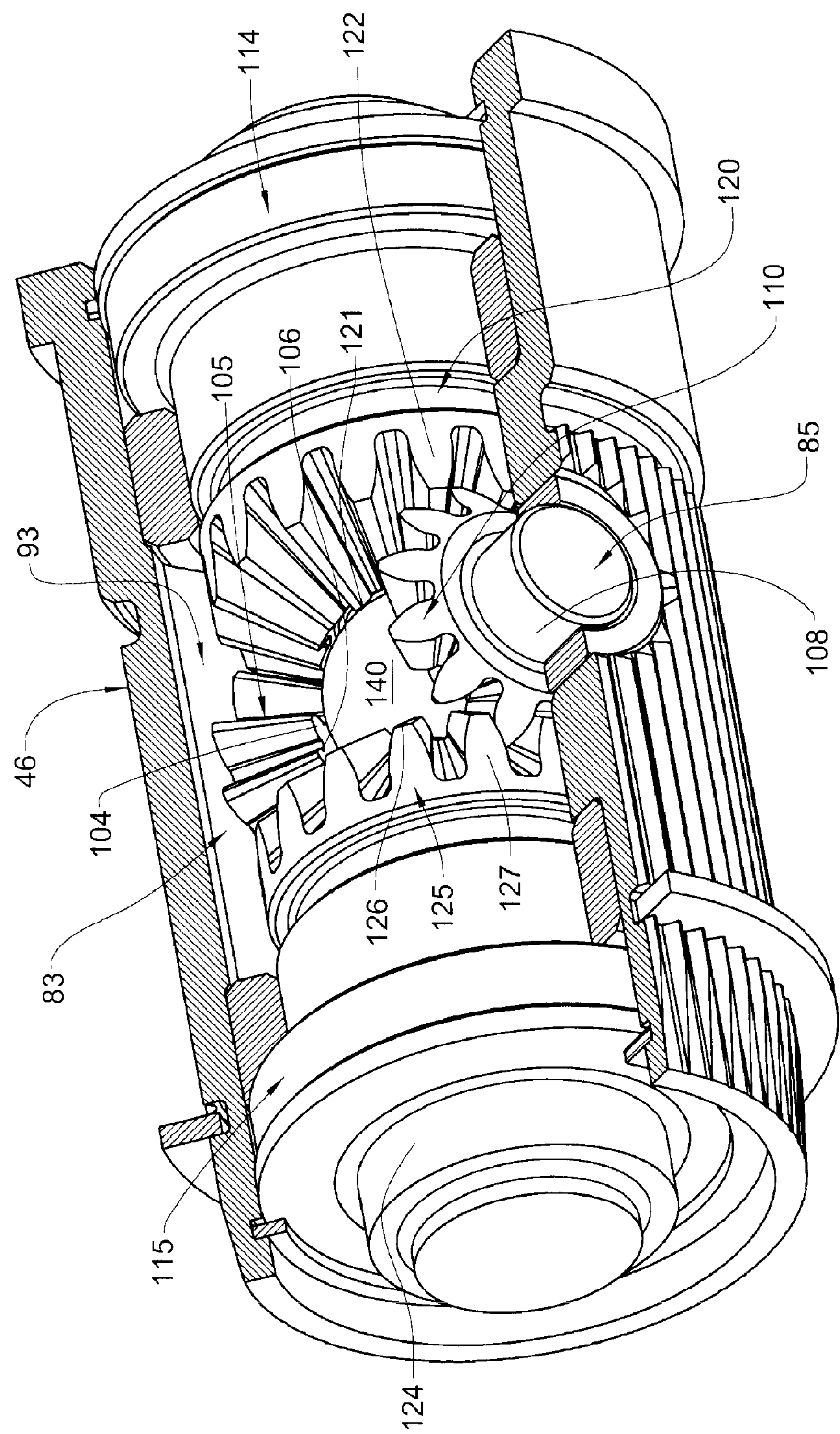
FIG. 3 is a lower left cut-away perspective view of a carrier of the differential gear set of FIG. 2.

As best shown in FIG. 2-3, electric motor 20 includes a stator assembly 30 having a stator housing 31. A stator core 33 is arranged within stator housing 31. Stator core 33 is surrounded by a plurality of stator windings 36 that are electrically connected to power terminals 10. Electric motor 20 also includes a rotor assembly 40 that is rotatably mounted relative to stator assembly 30. Rotor assembly 40 includes a hub portion 43 that defines, at least in part, a gear housing or carrier 46. Hub portion 43 also includes a lamination support element 50 that supports a plurality of rotor laminations 54. Carrier 46 is rotatably supported relative to stator housing 31 by first and second bearings 58 and 59. As will be discussed more fully below, carrier 46 also supports a differential gear assembly 70. Differential gear assembly 70 includes differential gear set 75 having a first planet gear 79, a second planet gear 81 a third planet gear 83 and a fourth planet gear 85 (FIG. 3). As will be discussed more fully below, first, second, third, and fourth planet gears 79, 81, 83, and 85 are rotatably mounted to carrier 46.

Figure 4:
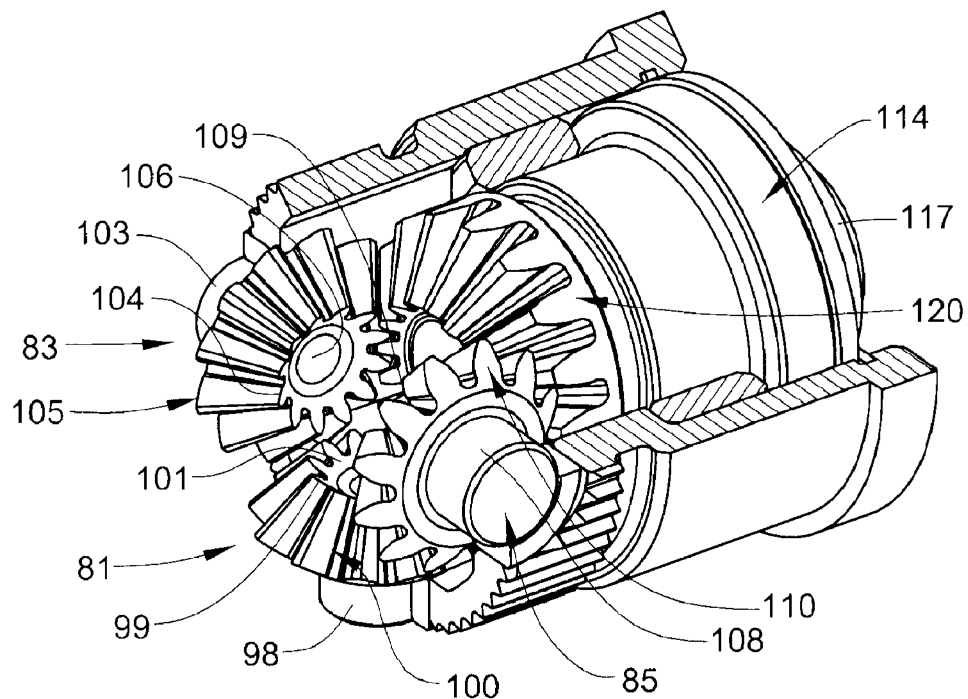
FIG. 4 is a cut-away view of the carrier of FIG. 3 illustrating a gear lash control member in accordance with one aspect of the exemplary embodiment.

Planet gears 79, 81, 83, 85, are arranged in an interior portion 93 of carrier 46. First planet gear 79 includes a planet gear shaft 95 that leads to an end portion 96 having a first plurality of planet gear teeth 97. End portion 96 includes a recessed region (not shown). Similarly, as best shown in FIG. 4, second planet gear 81 includes a second planet gear shaft 98 that leads to an end portion 99 having a second plurality of planet gear teeth 100. End portion 99 includes a recessed region 101. Likewise, third planet gear 83 includes a third planet gear shaft 103 that leads to an end portion 104 having a third plurality of planet gear teeth 105. End portion 104 includes a recessed region 106. Fourth planet gear 85 includes a fourth planet gear shaft 108 that leads to an end portion 109 having a fourth plurality of planet gear teeth 110. End portion 109 includes a recessed region (not shown).

In the embodiment shown, differential gear set 75 includes a first output member 114 and a second output member 115. First output member 114 includes a first output shaft 117 that is coupled to a first side gear 120. First side gear 120 includes a first end 121 that includes a first plurality of side gear teeth 122. Second output member 115 includes a second output shaft 122 that is coupled to a second side gear 125. Second side gear 125 includes a first end 126 having a second plurality of side gear teeth 127. The first plurality of side gear teeth 122 of first side gear 120 and the second plurality of side gear teeth 127 of second side gear 125 operatively engage with planet gears 79, 81, 83, and 85. In addition, each first end 121, 126 of each side gear 120, 125 includes a corresponding recessed zone, one of which is indicated at 131 in first end 121 of first side gear 120 as shown in FIG. 4. Differential gear set 75 enables first and second output members 114 and 115 to rotate at different rates such as during vehicle turns.

In the embodiment shown, differential gear set 75 is further shown to include a gear lash control member 140 that establishes a desired spacing or lash between adjacent ones of planet gears 79 and 83, and 81 and 85. Gear lash control member 140 further establishes a desired lash between planet gear 79, 81, 83, and 85 and first and second side gears 120 and 125. In accordance with one aspect of the exemplary embodiment, gear lash control member 140 includes a substantially curvilinear surface. In the exemplary embodiment shown, the substantially curvilinear surface defines a sphere. Gear lash control member 140 nests within recessed regions 101 and 106 of second and third planet gears 81 and 83 as well as the recessed regions (not shown) of first and fourth planet gears 79 and 85. Gear lash control member also nests within recessed zone 131 in side gear 120 and the recessed zone (not shown) formed in side gear 125.

Figure 5:
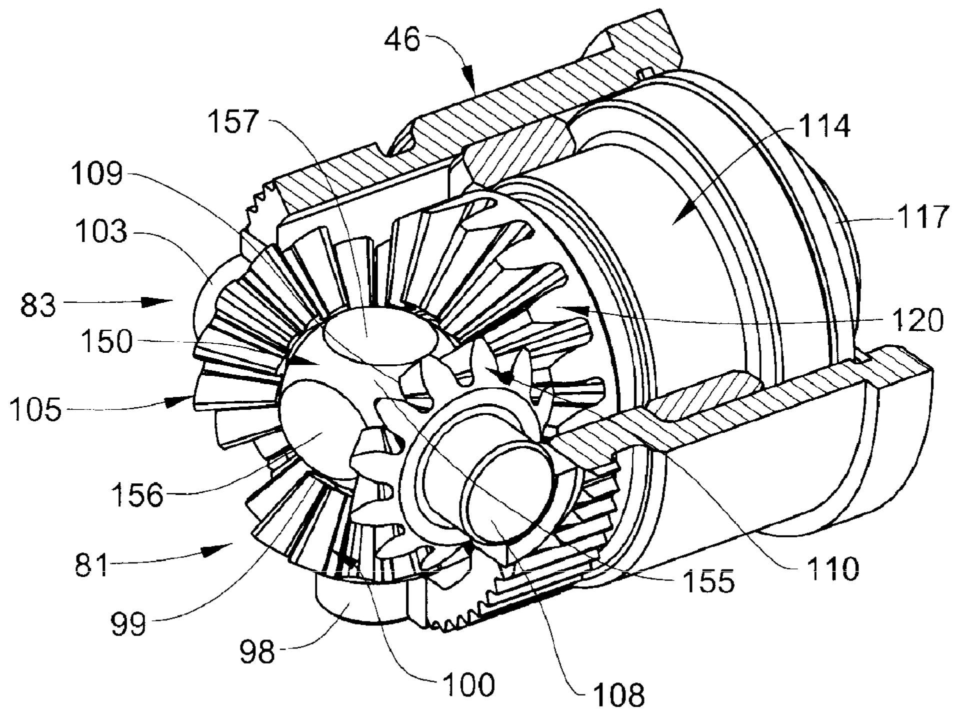
FIG. 5 is a cut-away view of the carrier of FIG. 3 illustrating a gear lash control member in accordance with another aspect of the exemplary embodiment.
Figure 6:
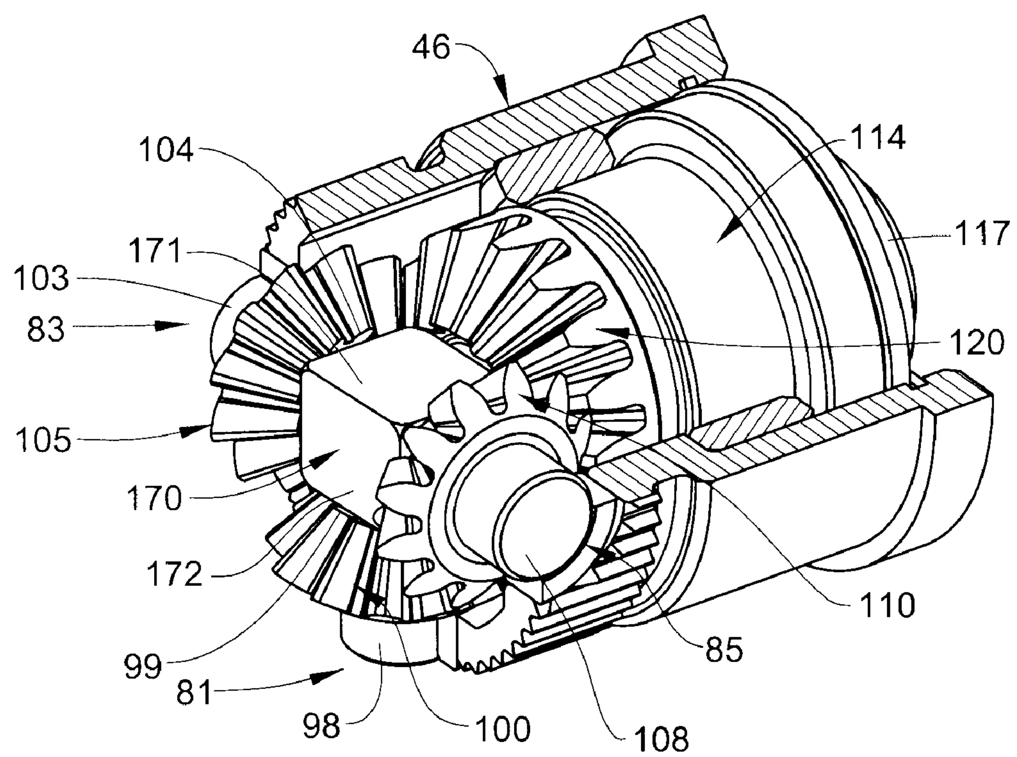
FIG. 6 is a cut-away view of the carrier of FIG. 3 illustrating a gear lash control member in accordance with yet another aspect of the exemplary embodiment.

In the event that planet gears 79, 81, 83, and 85 are formed without recesses, differential gear set 75 could include a gear lash control member such as indicated at 150 in FIG. 5, wherein like reference numbers represent corresponding parts in the respective views. Gear lash control member 150 includes a curvilinear surface that is provided with a plurality of substantially flat zones such as indicated at 156 and 157. The flat zones would correspond to end portions of the planet gears. Similarly, differential gear set 75 could also include a cubic gear lash control member such as shown at 170 in FIG. 6. Cubic gear lash control member 170 includes a plurality of substantially flat sides, two of which are shown at 171 and 172 that would correspond to end portions of the planet gears. At this point it should be understood that the particular size and shape of the gear lash control member could vary depending upon planet gear/side gear geometry. Regardless of shape, the exemplary embodiments provide a single gear lash control member that is interposed between each of the planet gears and the side gears to maintain desired gear spacing and/or lash.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A differential gear set comprising:

a gear housing;

a first planet gear rotatably mounted to the gear housing, the first planet gear including a first end portion that extends to a second end portion, the first end portion including a plurality of planet gear teeth;

a second planet gear rotatably mounted to the gear housing opposite the first planet gear, the second planet gear including a first end portion that extends to a second end portion, the first end portion including a plurality of planet gear teeth;

a side gear rotatably mounted in the gear housing, the side gear including a plurality of side gear teeth that mechanically engage with the plurality of planet gear teeth of the first planet gear and the plurality of planet teeth of the second planet gear; and a gear lash control member interposed between the first and second planet gears and the side gear, the gear lash control member having gin a continuous and substantially uninterrupted outer surface configured and disposed to maintain a desired gear lash of the plurality of planet gear teeth of the first and second planet gears and the plurality of side gear teeth of the side gear.

2. The differential gear set of claim 1, further comprising: another side gear rotatably mounted in the gear housing opposite the side gear, the another side gear including another plurality of side gear teeth that mechanically engage with the plurality of planet gear teeth of the first and second planet gears.

3. The differential gear set according to claim 2, wherein the continuous and substantially uninterrupted outer surface of the gear lash control member abuts the first end portion of each of the first and second planet gears and the first end of each of the side gear and the another side gear.

4. The differential gear set according to claim 1, wherein the continuous and substantially uninterrupted outer surface of the gear lash control member is substantially curvilinear.

5. The differential gear set according to claim 4, wherein the continuous and substantially uninterrupted outer surface defines a sphere.

6. The differential gear set according to claim 1, further comprising:

a third planet gear rotatably mounted to the gear housing off-set from each of the first and second planet gears, the third planet gear including a first end portion having a plurality of planet gear teeth that mechanically engage with the plurality of planet gear teeth of each of the first and second planet gears and the plurality of side gear teeth of the side gear; and a fourth planet gear rotatably mounted to the gear housing opposite the third planet gear, the fourth planet gear including a first end portion having a plurality of planet gear teeth that mechanically engage with the plurality of planet gear teeth of each of the first and second planet gears and the plurality of side gear teeth of the side gear.

7. The differential gear set according to claim 6, wherein the gear lash control member is interposed between the first, second, third and fourth planet gears and the side gear.

8. The differential gear set according to claim 2, further comprising:

a first output member operatively connected to the first side gear; and a second output member operatively coupled to the another side gear.

9. The differential gear set according to claim 1, wherein the differential gear set comprises a component of an electric machine.

10. The differential gear set according to claim 8, wherein the differential gear set is integrated into a rotor assembly of the electric machine.

11. The differential gear set according to claim 1, wherein the gear housing constitutes a carrier.

12. A method of establishing gear lash in a differential gear set, the method comprising:

mounting a first planet gear in a gear housing, the first planet gear including a first end portion having a plurality of planet gear teeth;

assembling a second planet gear to the gear housing opposite the first planet gear, the second planet gear including a first end portion having a plurality of planet gear teeth;

arranging a first side gear in the gear housing, the first side gear including a first end and a plurality of side gear teeth that inter-engage with the plurality of planet gear teeth of the first planet gear and the plurality of planet gear teeth of the second planet gear;

positioning a gear lash control member having a continuous and substantially uninterrupted outer surface at the first end portion of each of the first and second planet gears and the first end of the first side gear; and arranging a second side gear in the gear housing opposite the first side gear, the second side gear including a second plurality of side gear teeth that inter-engage with the plurality of planet gear teeth of the first planet gear and the plurality of planet gear teeth of the second planet gear, the second side gear being arranged directly adjacent the gear lash control member.

13. The method of claim 12, wherein positioning the gear lash control member at the first end portion of each of the first and second planet gears and the first side gear includes abutting the continuous and substantially uninterrupted outer surface of the gear lash member with a corresponding surface on each of the first and second planet gears and the first side gear.

14. The method of claim 12, further comprising: mounting a third planet gear to the gear housing, the third planet gear including a first end portion and a plurality of planet gear teeth that inter-engage with the plurality of planet gear teeth of the first and second planet gears and the plurality of side gear teeth of the first side gear, the first end portion of the third planet gear being arranged directly adjacent the gear lash control member.

15. The method of claim 14, further comprising: mounting a fourth planet gear to the gear housing opposite the third planet gear, the fourth planet gear including a first end portion and a plurality of planet gear teeth that inter-engage with the plurality of planet gear teeth of the first and second planet gears and the plurality of side gear teeth of the first side gear, the first end portion of the fourth planet gear being arranged directly adjacent the gear lash control member.

* * * * *